(12) United States Patent
Zehentner

(10) Patent No.: US 7,656,787 B2
(45) Date of Patent: Feb. 2, 2010

(54) MODULAR NUMERICAL CONTROL

(75) Inventor: Georg Zehentner, Teisendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 470 days.

(21) Appl. No.: 11/364,695

(22) Filed: Feb. 27, 2006

(65) Prior Publication Data

US 2006/0198239 A1 Sep. 7, 2006

(30) Foreign Application Priority Data

Mar. 3, 2005 (DE) .................... 10 2005 009 707

(51) Int. Cl.
*G01R 31/08* (2006.01)
*G06F 11/00* (2006.01)
(52) U.S. Cl. .............. 370/218; 370/216; 370/217; 714/2; 714/25
(58) Field of Classification Search .......... 370/241, 370/276, 431, 442, 216, 464, 498, 503, 516, 370/517, 519, 217, 218; 714/2, 100, 1, 25; 340/825, 3.42, 3.43
See application file for complete search history.

(56) References Cited

U.S. PATENT DOCUMENTS 5,274,311 A 12/1993 Littlejohn et al.
6,853,292 B1 * 2/2005 Kramer et al. ............. 340/3.43
6,957,115 B1 10/2005 Meyer-Grafe et al.
2002/0034195 A1 * 3/2002 Chen et al. .................. 370/519
2002/0126620 A1 * 9/2002 Heckel et al. ............... 370/216
2004/0003317 A1 * 1/2004 Kwatra et al. ................ 714/25
2005/0041592 A1 * 2/2005 Hannel et al. ............... 370/241

FOREIGN PATENT DOCUMENTS

DE 198 40 562 3/2000
WO WO 00/79352 12/2000

\* cited by examiner

*Primary Examiner*—Ricky Ngo
*Assistant Examiner*—Paul Masur
(74) *Attorney, Agent, or Firm*—Kenyon & Kenyon LLP

(57) ABSTRACT

A modular, numerical control includes at least two modules, each including a microprocessor unit and being connected to each other via serial data-transmission channels for the transmission of information in the form of data packets. In at least one module, a data-packet generating unit is provided for generating data packets and for transmitting data packets to at least one further module. In so doing, the data-packet generating unit operates independently of the function of the microprocessor unit. Moreover, in at least one module, a data-packet processing unit is provided by which data packets are able to be processed and/or are able to be transmitted to at least one further module, independently of the function of the microprocessor unit. The data packets include the status of at least one safety signal.

13 Claims, 4 Drawing Sheets

MODULAR NUMERICAL CONTROL

CROSS-REFERENCE TO RELATED APPLICATIONS

The present application claims priority to Application No. 10 2005 009 707.3, filed in the Federal Republic of Germany on Mar. 3, 2005, which is expressly incorporated herein in its entirety by reference thereto.

FIELD OF THE INVENTION

The present invention relates to a modular, numerical control. In such a modular, numerical control, safety-related information may be transmitted reliably via serial interfaces.

BACKGROUND INFORMATION

Numerical controls (NC) are used primarily for controlling machine tools, and may be subdivided essentially into two functional units, a main computer and at least one controller unit.

The main computer makes available the user interfaces such as keyboard and monitor necessary for operating the NC, and is used for creating, storing and executing programs. Located in the controller units are control loops which are used for driving converter modules, that in turn drive motors. The controller units also include digital and/or analog interfaces for acquiring actual values needed continuously during a program execution for controlling the control loops. The actual values to be acquired may, for example, be position values, speed values, acceleration values or also current values. Similar to the main computer, the controller units are also microprocessor-controlled.

There may be the desire to spatially separate the main computer and the controller units. Thus, it may be provided to combine the main computer together with the keyboard and the monitor in one housing, in order to create a user interface permitting optimal placement for the user from the standpoint of ergonomics. It may be desirable to arrange the controller units close to the converters, to ensure optimal signal quality of the pulse-width-modulated control signals.

Serial interfaces present themselves for the data transmission between spatially separated units, since cables having only a few wires may be used, which may be very inexpensive and easy to manipulate compared to cables for data transmission via parallel interfaces.

The transmission of safety-related information may be regarded as problematic in such a system architecture, since the microprocessor-controlled units determine what data is transmitted via the serial interface. Therefore, in the event a microprocessor-controlled unit malfunctions, caused, for example, by a program crash or by external influences (e.g., fluctuations in the operating voltage, overheating of modules), it may happen that safety-related information will not be transmitted. Particularly in the case of an emergency shutdown due to safety, this can have dangerous consequences ranging from material damage to the machine tool, right up to endangering life and limb of the operating personnel.

U.S. Pat. No. 5,274,311 describes a modular motor-control system, which includes a motor-control module, an input/output module and a processor module which communicate with each other via a differential two-wire interface. For reliable transmission of a shut-off signal, a separate line is provided that is parallel to the two-wire interface to all modules. Reliable shutdown may thereby be ensured, even if the data transmission via the two-wire interface fails.

Considered to be disadvantages of this design approach are first of all, that an additional line is needed, and secondly, that only a dedicated signal can be transmitted via the one additional line.

SUMMARY

Example embodiments of the present invention may provide a modular, numerical control that allows reliable transmission of safety-related information via serial interfaces, without having to use additional lines for this purpose.

A modular, numerical control is provided that may include at least two modules, each including a microprocessor unit and being connected to each other via serial data-transmission channels for the transmission of information in the form of data packets. In at least one module, a data-packet generating unit is provided for generating data packets and for transmitting data packets to at least one further module. In so doing, the data-packet generating unit operates independently of the function of the microprocessor unit. Moreover, in at least one module, a data-packet processing unit is provided by which data packets are able to be processed and/or transmitted to at least one further module, likewise independently of the function of the microprocessor unit. The data packets include the status of at least one safety signal.

According to an example embodiment of the present invention, a modular, numeric control includes: at least two modules, each module including a microprocessor unit and connected to each other via serial data-transmission channels to transmit information as data packets. At least one first module includes a data-packet generation unit adapted to generate data packets and transmit data packets to at least one further module, the data-packet generation unit adapted to operate independently of functioning of the microprocessor unit. At least one second module includes a data-packet processor unit adapted to at least one of (a) process data packets and (b) transmit data packets to at least one further module independently of functioning of the microprocessor unit. The data packets include a status of at least one safety signal.

At least one safety signal may be supplied to the data-packet generation unit, and the data-packet generation unit may be adapted to insert the status of the at least one safety signal in generated data packets.

Data packets may be generated and transmitted in determined time intervals.

The data-packet processor unit may be adapted to output at least one shut-off signal as a function of at least one safety signal included in the data packet.

The data-packet processor unit may be supplied with at least one safety signal, a status of which may be insertable into received data packets transmittable to at least one further module.

The at least two modules may include a main computer and at least one controller unit connected to each other in series via a serial-data transmission channel. The data-packet generation unit may be arranged in the main computer, and the data-packet processor unit may be arranged in the at least one controller unit.

The at least two modules may include a main computer and at least one controller unit connected to each other in a series circuit via serial data-transmission channels. The data-packet generation unit may be arranged in the main computer, and the at least one controller unit may include a first data-packet processor unit adapted to process and transmit to a next controller unit of the series circuit data packets that arrive from a direction of the main computer. The at least one controller unit may include a second data-packet processor unit adapted to process and transmit in the direction of the main computer data packets that arrive from a direction of a final controller unit of the series circuit.

The serial data-transmission channels may include a transmit channel and a receive channel, and the transmit channel may be connected to the receive channel at the final controller unit of the series circuit. Data packets that arrive at the final controller unit of the series circuit from the direction of the main computer may be transmittable in the direction of the main computer.

The main computer may include a final data-packet processor unit adapted to process data packets and to switch a shut-off signal in accordance with a status of at least one safety signal included in received data packets.

The main computer may include a second data-packet generation unit, and the final controller unit of the series circuit may be connected via a serial data-transmission channel to the main computer. Data packets may be transmittable both from the data-packet generation unit in the direction of the final controller unit and from the second data-packet generation unit in an opposite direction of the series circuit.

The main computer may include a final data-packet processor unit adapted to process data packets that arrive from the direction of the final controller unit of the series circuit.

The main computer may include a second final data-packet processor unit adapted to process data packets that arrive from a direction of a first controller unit of the series circuit.

The second final data-packet processor unit may be adapted to switch a shut-off signal in accordance with the status of at least one safety signal included in received data packets.

The main computer may include a main-computer monitor unit adapted to output to the data-packet generation unit a first internal safety signal having a status that changes if a defined time duration is exceeded, and a measurement of the defined time duration may be resettable in the main-computer monitor unit by the microprocessor unit by a trigger line.

The at least one controller unit may include a controller monitor unit adapted to output to the first data-packet processor unit a second internal safety signal having a status that changes if a defined time duration is exceeded, and a measurement of the defined time duration may be resettable in the controller monitor unit by the microprocessor unit by a trigger line.

Further features and aspects of example embodiments of the present invention are described in more detail below with reference to the appended Figures.

DETAILED DESCRIPTION

Figure 1:
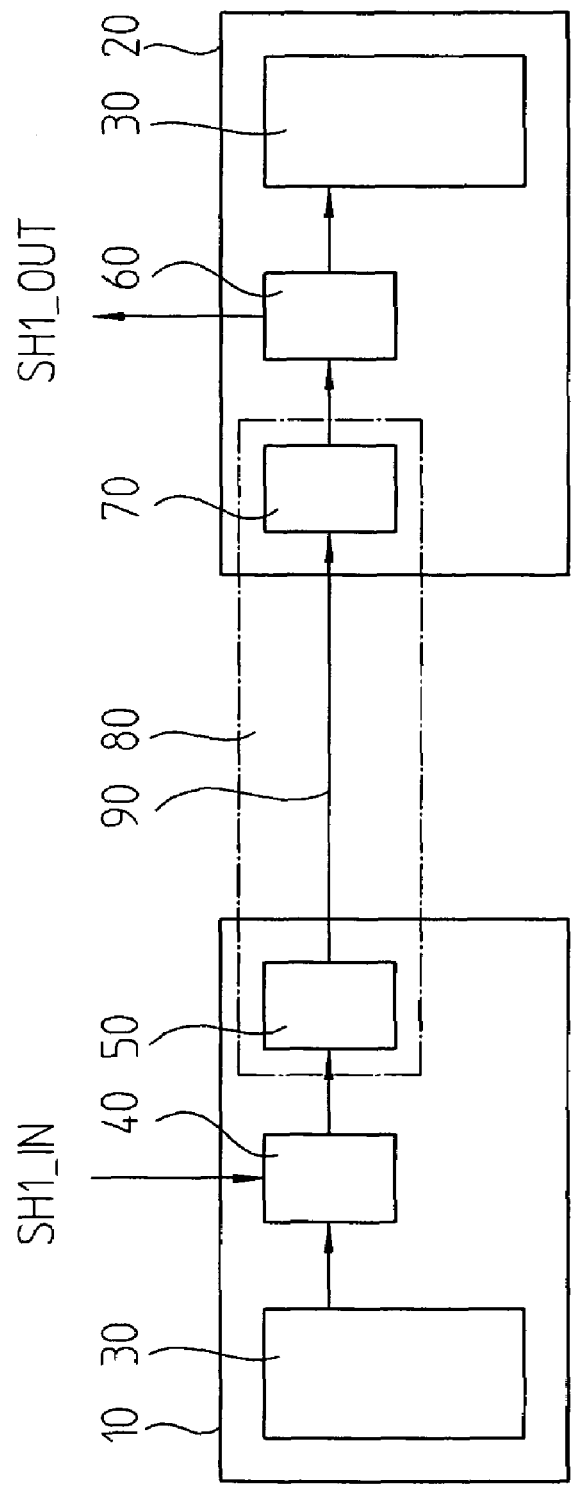
FIG. 1 is a block diagram of a modular, numerical control according to an example embodiment of the present invention.

FIG. 1 illustrates a modular, numerical control according to an example embodiment of the present invention. It includes two modules, a main computer 10 and a controller unit 20. Each module includes a microprocessor unit 30. Main computer 10 further includes a data-packet generating unit 40, to which a safety signal SH1_IN is fed, and a main transmitter unit 50. Located in controller unit 20 is a data-packet processing unit 60 which outputs a shut-off signal SH1_OUT, and a first receiver unit 70. Main computer 10 and controller unit 20 are connected via a serial data-transmission channel 80, which includes main transmitter unit 50 and first receiver unit 70, with whose aid a unidirectional data transmission is possible from main computer 10 to controller unit 20 via a transmit channel 90.

Since the type and the construction of microprocessor units 30 may be a matter of choice, they are provided with the same reference numeral in main computer 10 and in controller unit 20. However, it should understood that microprocessor unit 30 in main computer 10 may differ from microprocessor unit 30 in controller unit 20. Thus, for example, microprocessor unit 30 in main computer 10 may be a personal computer (PC) which is capable of receiving commands via an input device (keyboard, mouse, etc.) and processing them, displaying information on a monitor and organizing data in storage media. On the other hand, microprocessor unit 30 in controller unit 20 may be controlled by a signal processor and contain control loops, as well as interfaces for acquiring actual values (position values, current values, etc.), and for driving converter modules, that in turn activate drive axles.

During the execution of a program, for example, for the machining of a workpiece by a machine tool which is controlled by the modular, numerical control, main computer 10 transmits data, e.g., setpoint values, to controller unit 20 in equidistant time intervals. In so doing, the data to be transmitted is fed by microprocessor unit 30 in main computer 10 to data-packet generating unit 40. From the data to be transmitted and the status of safety signal SH1_IN, it forms a data packet in equidistant time intervals and transmits it via serial data-transmission channel 80 to data-packet processing unit 60 in controller unit 20. Data-packet processing unit 60 relays the data contained in the data packet to microprocessor unit 30 of controller unit 20, and switches shut-off signal SH1_OUT on or off depending on the status of safety signal SH1_IN.

The formation of the data packets in data-packet generating unit 40 in main computer 10, the transmission of the data packets via serial data-transmission channel 80 and the subsequent evaluation of the data packets, especially the status of safety signal SH1_IN, in data-packet processing unit 60 are independent of microprocessor units 30. This means, first of all, that even if microprocessor unit 30 in main computer 10 fails, data packets continue to be formed and transmitted. Secondly, even if microprocessor unit 30 in controller unit 20 fails, upon reception of a data packet, the status of safety signal SH1_IN is checked and, if applicable, a safety shutdown is initiated via shut-off signal SH1_OUT. It may be provided to implement data-packet generating unit 40 as well as data-packet processing unit 60 as digital level-operated automatons (state machines), with a separate, independent time base. For example, such a circuitry may be integrated in a programmable logic module, e.g., in an FPGA (field programmable gate array).

Figure 2:
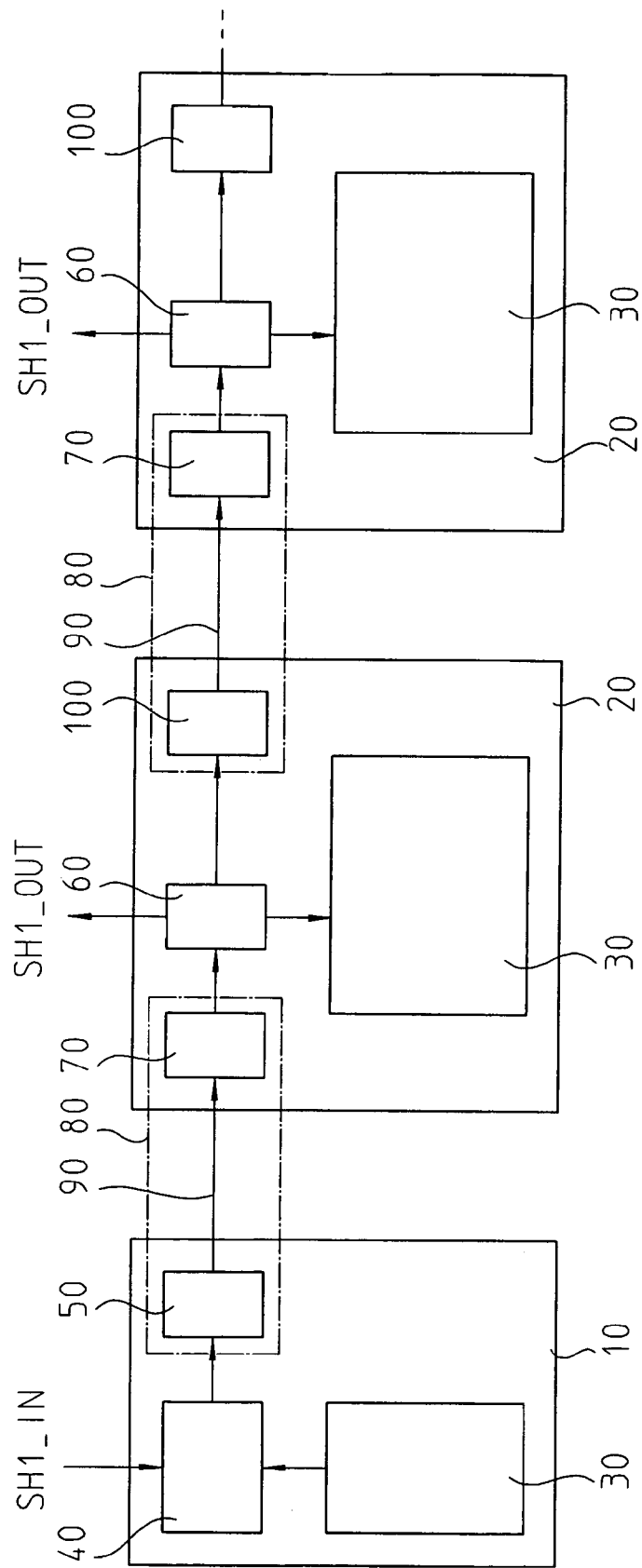
FIG. 2 is a block diagram of a modular, numerical control according to an example embodiment of the present invention.

FIG. 2 is a block diagram of a modular, numerical control according to an example embodiment of the present invention. It includes a main computer 10 and two controller units 20, which are interconnected in the form of a series circuit by serial data-transmission channels 80. In comparison to FIG. 1, controller units 20 additionally include a first transmitter unit 100 which, together with transmit channel 90 and first receiver unit 70 of following controller unit 20 of the series circuit, form serial data-transmission channel 80. Serial data-transmission channel 80, which connects main computer 10 to first controller unit 20 of the series circuit, includes, as in FIG. 1, main transmitter unit 50, transmit channel 90 and first receiver unit 70 of first controller unit 20 of the series circuit. Data-packet processing unit 60 is arranged such that first, it evaluates the status of safety signal SH1_IN and, if applicable, initiates an emergency shutdown via shut-off signal SH1_OUT. Secondly, it feeds data contained in the data packet to microprocessor unit 30. Thirdly, it relays arriving data packets to first transmitter unit 100, which transmits them to following controller unit 20 of the series circuit.

In this manner, starting from main computer 10, the status of safety signal SH1_IN is transmitted sequentially to all controller units 20 of the series circuit. Since both data-packet generating unit 40 and data-packet processing unit 60 operate independently of microprocessor units 30, it is provided that the status of safety signal SH1_IN will be transmitted, even in the event that one or more microprocessor units 30 fail.

As indicated by the broken line at the output of first transmitter unit 100 of second controller unit 20 of the series circuit, the arrangement illustrated in FIG. 2 may be expanded by a plurality of further controller units 20.

Figure 3:
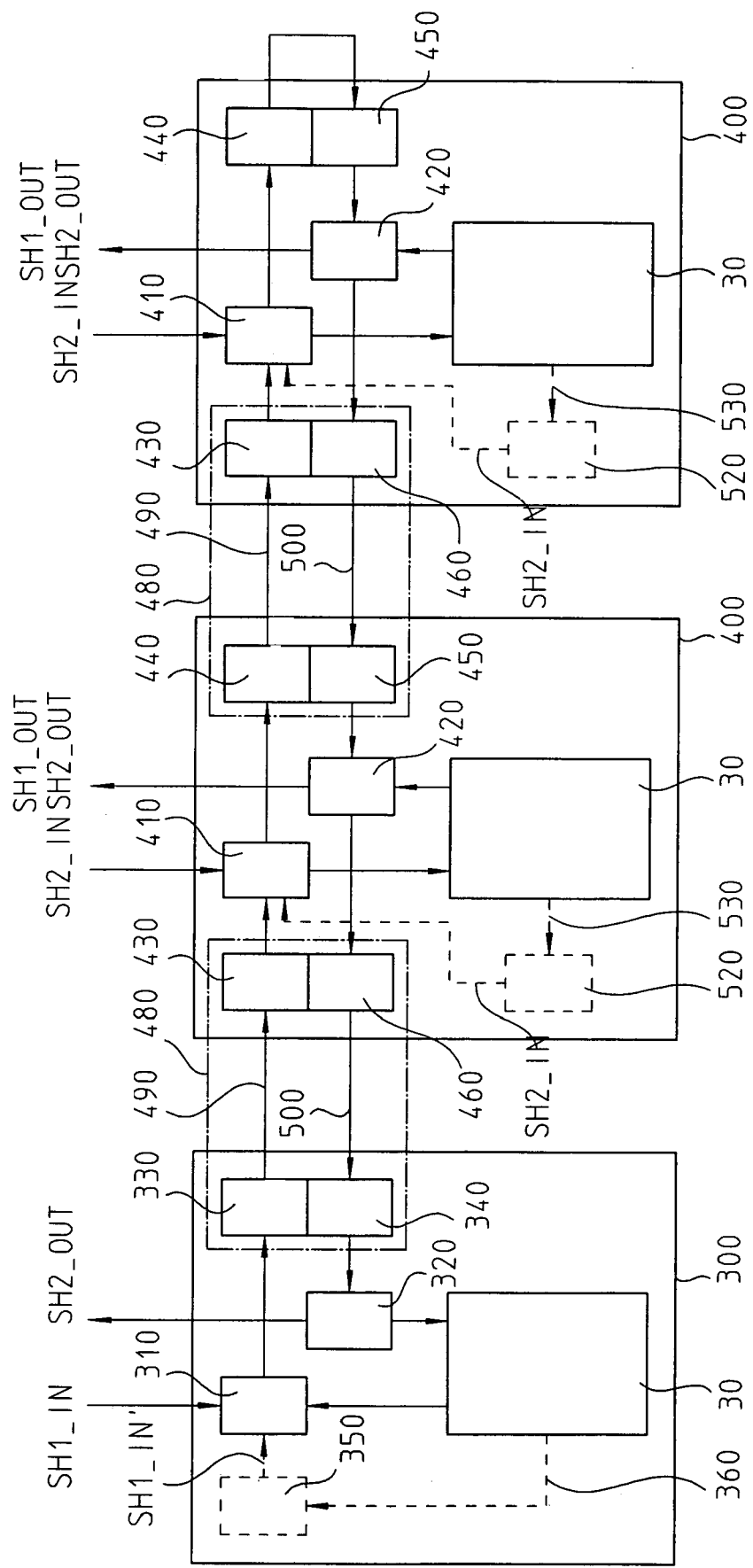
FIG. 3 is a block diagram of a modular, numerical control according to an example embodiment of the present invention.

FIG. 3 illustrates a modular, numerical control according to an example embodiment of the present invention. It includes a main computer 300 and two controller units 400 which, starting from main computer 300, are interconnected in the form of a series circuit.

In addition to microprocessor unit 30, main computer 300 includes a data-packet generating unit 310, a final data-packet processing unit 320, as well as a main transmitter unit 330 and a main receiver unit 340. As in the previous examples, a safety signal SH1_IN is fed to data-packet generating unit 310. On the other hand, final data-packet processing unit 320 outputs a shut-off signal SH2_OUT.

Controller units 400 include a first data-packet processing unit 410, a second data-packet processing unit 420, a first receiver unit 430, a first transmitter unit 440, a second receiver unit 450 and a second transmitter unit 460. In addition, a microprocessor unit 30 is located in each controller unit 400. A safety signal SH2_IN is fed to first data-packet processing unit 410, while second data-packet processing unit 420 outputs two shut-off signals SH1_OUT and SH2_OUT.

In this arrangement, serial data-transmission channels 480, via which main computer 300 is connected to first controller unit 400 of the series circuit and controller units 400 are connected to each other, are arranged to be bidirectional. Thus, serial data-transmission channel 480, which connects main computer 300 to first controller unit 400 of the series circuit, includes main transmitter unit 330 which transmits data packets to first receiver unit 430 via a transmit channel 490, and main receiver unit 340 which receives data packets from second transmitter unit 460 via a receive channel 500. Analogous thereto, serial data transmission channel 480, which connects controller units 400 to each other, includes first transmitter unit 440 which transmits data packets to first receiver unit 430 of following controller unit 400 of the series circuit via transmit channel 490, and second receiver unit 450 which receives data packets from second transmitter unit 460 of following controller unit 400 of the series circuit via receive channel 500.

A widely prevalent serial data interface which may be particularly suitable for forming serial data-transmission channels 480 is conventional primarily from the field of Local Area Networks (LAN), and bears the designation FAST ETHERNET (Standard IEEE Std. 802.3-2002). It may be that the data-transmission method as described in the Standard IEEE 802.3 is only conditionally suitable for time-critical applications, since it was believed to have been developed primarily for office technology for transmitting large quantities of data, and thereby has no determined time response. On the basis of the physical level of the standard IEEE 802.3 (layer 1 of the OSI/ISO reference model), however, it is possible to provide a real-time-capable data-transmission system. This may provide that it is possible to fall back upon a tried and tested technology, for which a large number of components may be available on the market at a favorable price.

Data-packet generating unit 310 in main computer 300 is arranged such that, during the execution of a program, it forms data packets in determined, e.g., equidistant time intervals from data transmitted to it by microprocessor unit 30 and from the status of safety signal SH1_IN, and transmits the data packets via serial data-transmission channel 480 to first controller unit 400 of the series circuit. Different from the above-described exemplary embodiments, the data which microprocessor unit 30 transmits to data-packet generating unit 310 also includes the information as to whether it is a writing or/and reading access. As in the above-described exemplary embodiments, the data packets are formed and transmitted independently of microprocessor unit 30. If, because of a malfunction, no data from microprocessor unit 30 arrives at data-packet generating unit 310, then data-packet generating unit 310 forms data packets in which the area which is provided for accommodating the data to be transmitted is empty, or they have no such area at all. In controller unit 400, the data contained in a received data packet is read out in first data-packet processing unit 410 and relayed to microprocessor unit 30. In addition, first data-packet processing unit 410 inserts the status of safety signal SH2_IN into the data packet and forwards it to next controller unit 400 of the series circuit.

At last controller unit 400 of the series circuit, transmit channel 490 is connected to receive channel 500, i.e., data packets which are transmitted by first transmitter unit 440 are sent back in the reverse direction and reach second data-packet processing unit 420 of controller unit 400 via second receiver unit 450. The second data-packet processing unit evaluates the status of safety signals SH1_IN and SH2_IN and switches shut-off signals SH1_OUT and SH2_OUT on or off depending on the status of safety signals SH1_IN and SH2_IN. Moreover, in the case of a reading access, second data-packet processing unit 420 inserts data, fed to it by microprocessor unit 30, into the data packet and forwards it via serial data-transmission channel 480 to next controller unit 400 in the direction of main computer 300. It should be understood that the data packet is forwarded independently of the function of microprocessor unit 30, i.e., even if microprocessor unit 30 transmits no data to second data-packet processing unit 420, the data packet is forwarded.

The data packet ultimately reaches final data-packet processing unit 320 in main computer 300. It transmits the data contained in the data packet, possibly modified by controller units 400, to microprocessor unit 30 for further processing. In the event that safety-related units are also connected to main computer 300, final data-packet processing unit 320 evaluates the status of safety signal SH2_IN and switches shut-off signal SH2_OUT on or off as a function thereof.

In this exemplary embodiment, the relationship between safety signals SH1_IN, SH2_IN and shut-off signals SH1_OUT, SH2_OUT is regulated as follows:

The status of safety signal SH1_IN directly determines the state of shut-off signal SH1_OUT, i.e., if the status of SH1_IN signals a fault, shut-off signal SH1_OUT is then switched to active in each controller unit 400.

The status of all safety signals SH2_IN is OR-ed, i.e., as soon as safety signal SH2_IN of one controller unit 400 indicates a fault, all shut-off signals SH2_OUT are switched to active.

The relationship between safety signals SH1_IN, SH2_IN and shut-off signals SH1_OUT, SH2_OUT may also be regulated completely differently. Thus, for example, safety signal SH1_IN may only cause a shutdown of the drives of a specific controller unit 400. The same holds true for the number of safety signals and shut-off signals. Thus, an arbitrary number of safety signals may lead, via a single shut-off signal, to the shutdown of all modules controlled by the modular, numerical control.

In addition to, or instead of safety signals SH1_IN, SH2_IN, internal safety signals may also be generated. Thus, in main computer 300, broken lines are used for indicating a main-computer monitoring unit 350, via whose output an internal safety signal SH1_IN' arrives at data-packet generating unit 310. Analogous thereto, provided in controller units 400 is a controller monitoring unit 520, via whose output an internal safety signal SH2_IN' is supplied to first data-packet processing unit 410.

Such monitoring units are referred to as watchdog circuits. Their function corresponds essentially to that of a retriggerable monoflop. As long as the circuit is reset regularly within its set switchover time by a trigger pulse, the level at its output remains the same. If this defined time duration is violated, i.e., if the time between two trigger pulses exceeds the set switchover time, the level at the output of the circuit changes. In practice, a watchdog circuit may be implemented, for example, using a free-running counter having an overrun output which is able to be reset by a trigger pulse. If the trigger pulse fails to appear, an overrun of the counter occurs, and the level at the overrun output changes.

In the example illustrated in FIG. 3, main-computer monitoring unit 350 receives the trigger pulses from microprocessor unit 30 of main computer 300 via a trigger line 360. To prevent main-computer monitoring unit 350 from altering the status of internal safety signal SH1_IN', the program which is executed in main computer 300 should be written such that a trigger pulse is always generated by a program command within the set switchover time of main-computer monitoring unit 350. In the event of a malfunction, when, for example, due to a program crash, the program command for generating the trigger pulse is no longer carried out or is carried out too late, the trigger pulse fails to appear. The defined time duration is thereby exceeded, and internal safety signal SH1_IN' changes its level.

The same holds true for controller monitoring unit 520. It receives its trigger pulse from microprocessor unit 30 of controller unit 400 via trigger line 530. The failure of the trigger pulse to appear is signaled here by the level of internal safety signal SH2_IN'.

Since, as described above, data packets which include the status of internal safety signals SH1_IN' and SH2_IN' are formed and transmitted independently of the function of microprocessor units 30, it may therefore be ensured that, in the event of a malfunction of a microprocessor unit 30, an emergency shutdown of all drives connected to the modular, numerical control may be initiated.

Figure 4:
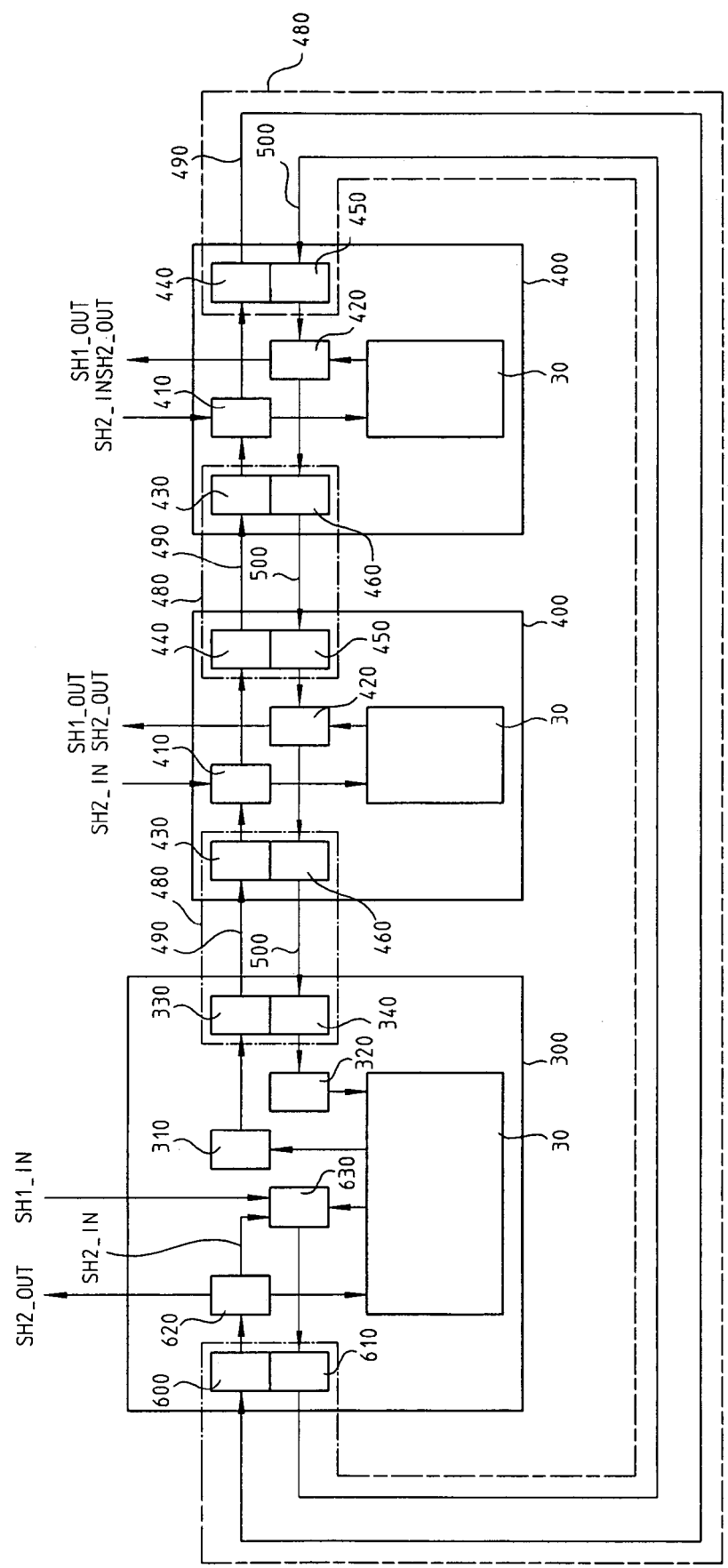
FIG. 4 is a block diagram of a modular, numerical control according to an example embodiment of the present invention.

FIG. 4 is a block diagram of a modular, numerical control according to an example embodiment of the present invention. For reasons of clarity, the depiction of the monitoring units for generating the internal safety signals, as were described with reference to FIG. 3, is omitted in FIG. 4.

Deviating from the example illustrated in FIG. 3, main computer 300 illustrated in FIG. 4 additionally includes a second main receiver unit 600, a second main transmitter unit 610, as well as a second final data-packet processing unit 620 and a second data-packet generating unit 630.

Second main receiver unit 600 is connected via a transmit channel 490 to first transmitter unit 440 of final controller unit 400 of the series circuit. Second main transmitter unit 610 is connected via a receive channel 500 to second receiver unit 450 of final controller unit 400. Thus, a serial data-transmission channel 480 is formed which connects final controller unit 400 of the series circuit to main computer 300.

Second final data-packet processing unit 620 and second data-packet generating unit 630 operate analogously to final data-packet processing unit 320 and data-packet generating unit 310, respectively. Safety signal SH1_IN is fed to second data-packet generating unit 630. It forms data packets in determined time intervals from data supplied to it by microprocessor unit 30 and from the status of safety signal SH1_IN, and transmits them via serial data-transmission channel 500 to final controller unit 400 of the series circuit. Second final data-packet processing unit 620 receives data packets via serial data-transmission channel 490, processes them and switches shut-off signal SH2_OUT depending on the status of safety signal SH2_IN. The function of second final data-packet processing unit 620 and of second data-packet generating unit 630 is independent of the function of microprocessor unit 30.

In controller units 400, first data-packet processing unit 410 is in each case constructed such that it inserts the status of safety signal SH2_IN into arriving data packets and forwards them to following controller unit 400 of the series circuit. On the other hand, an evaluation of safety signals SH1_IN and SH2_IN, especially switching of shut-off signals SH1_OUT and SH2_OUT depending on the status of safety signals SH1_IN and SH2_IN, takes place only in second data-packet processing unit 420 in controller units 400. For this reason, deviating from the exemplary embodiment illustrated in FIG. 3, no safety signal is supplied to data-packet generating unit 310, and final data-packet processing unit 320 outputs no shut-off signal. Instead, data-packet generating unit 310 fills the areas in the generated data packets which should contain the status of safety signals, with values that correspond to inactive safety signals.

To ensure that the status of safety signal SH2_IN reaches all controller units, second data-packet processing unit 620 may reconstruct signal SH2_IN from the status of safety signal SH2_IN included in arriving data packets, and supplies it to second data-packet generating unit 630, which in turn inserts it into data packets which it generates. For example, without this measure, controller units 400 located in front of final controller unit 400 would not recognize a problem which is indicated to final controller unit 400 via safety signal SH2_IN, since the data packets which include the status of this safety signal SH2_IN are forwarded only in the direction of main computer 300.

In this exemplary embodiment, it may be provided that the data packets do not have to pass twice through all controller units of the series circuit, but rather, after passing through the series circuit one time, are sent directly back to main computer 300. Moreover, data packets may be transmitted from two directions to the controller units, which means a higher transmission reliability may be achievable. In other words, a double ring structure is formed, in which data packets which were generated by data-packet generating unit 310, after passing through controller units 400 of the series circuit one time (clockwise, based on the representation in FIG. 4), arrive at second final data-packet processing unit 620 in main computer 300, and, analogous thereto, data packets which were generated by second data-packet generating unit 630, after passing through the series circuit one time (counter clockwise, based on the representation in FIG. 4), arrive at data-packet processing unit 320 of final data-packet processing unit 320.

What is claimed is:

1. A modular, numeric control, comprising:
   at least two modules, each module including a microprocessor unit and connected to each other via serial data-transmission channels to transmit information as data packets;
   wherein at least one first module includes a data-packet generation unit adapted to generate data packets and transmit data packets to at least one further module;
   wherein at least one second module includes a data-packet processor unit adapted to at least one of: (a) process data packets independently of malfunctioning of the microprocessor unit of the second module; and (b) transmit data packets to at least one further module independently of malfunctioning of the microprocessor unit of the second module;
   wherein each data packet includes a status of at least one safety signal;
   wherein the data-packet generation unit is adapted to generate, independently of malfunctioning of the microprocessor unit of the first module, the data packets, including the status of the at least one safety signal;
   wherein the data-packet generation unit is adapted to transmit, independently of malfunctioning of the microprocessor unit of the first module, the data packets, including the status of the at least one safety signal, to the at least one further module;
   wherein the at least two modules include a main computer and at least one controller unit connected to each other in a series circuit via serial data-transmission channels, the data-packet generation unit arranged in the main computer, the at least one controller unit including a first data-packet processor unit adapted to process and transmit to a next controller unit of the series circuit data packets that arrive from a direction of the main computer, the at least one controller unit including a second data-packet processor unit adapted to process and transmit in the direction of the main computer data packets that arrive from a direction of a final controller unit of the series circuit; and
   wherein the main computer includes a final data-packet processor unit adapted to process data packets and to switch a shut-off signal in accordance with a status of at least one safety signal included in received data packets.

2. The modular, numeric control according to claim 1, wherein at least one safety signal is supplied to the data-packet generation unit, the data-packet generation unit adapted to insert the status of the at least one safety signal in generated data packets.

3. The modular, numeric control according to claim 1, wherein data packets are generated and transmitted in determined time intervals.

4. The modular, numeric control according to claim 1, wherein the data-packet processor unit is adapted to output at least one shut-off signal as a function of at least one safety signal included in the data packet.

5. The modular, numeric control according to claim 1, wherein the data-packet processor unit is supplied with at least one safety signal, a status of which is insertable into received data packets transmittable to at least one further module.

6. The modular, numeric control according to claim 1, wherein the at least two modules include a main computer and at least one controller unit connected to each other in series via a serial-data transmission channel, the data-packet generation unit arranged in the main computer, the data-packet processor unit arranged in the at least one controller unit.

7. The modular, numeric control according to claim 1, wherein the serial data-transmission channels include a transmit channel and a receive channel, the transmit channel connected to the receive channel at the final controller unit of the series circuit, data packets that arrive at the final controller unit of the series circuit from the direction of the main computer transmittable in the direction of the main computer.

8. The modular, numeric control according to claim 1, wherein the main computer includes a second data-packet generation unit, the final controller unit of the series circuit connected via a serial data-transmission channel to the main computer, data packets transmittable both from the data-packet generation unit in the direction of the final controller unit and from the second data-packet generation unit in an opposite direction of the series circuit.

9. The modular, numeric control according to claim 8, wherein the main computer includes a final data-packet processor unit adapted to process data packets that arrive from the direction of the final controller unit of the series circuit.

10. The modular, numeric control according to claim 8, wherein the main computer includes a second final data-packet processor unit adapted to process data packets that arrive from a direction of a first controller unit of the series circuit.

11. The modular, numeric control according to claim 10, wherein the second final data-packet processor unit is adapted to switch a shut-off signal in accordance with the status of at least one safety signal included in received data packets.

12. The modular, numeric control according to claim 1, wherein the main computer includes a main-computer monitor unit adapted to output to the data-packet generation unit a first internal safety signal having a status that changes if a defined time duration is exceeded, a measurement of the defined time duration resettable in the main-computer monitor unit by the microprocessor unit by a trigger line.

13. The modular, numeric control according to claim 1, wherein the at least one controller unit includes a controller monitor unit adapted to output to the first data-packet processor unit a second internal safety signal having a status that changes if a defined time duration is exceeded, a measurement of the defined time duration resettable in the controller monitor unit by the microprocessor unit by a trigger line.

* * * * *

UNITED STATES PATENT AND TRADEMARK OFFICE
CERTIFICATE OF CORRECTION

PATENT NO. : 7,656,787 B2  
APPLICATION NO. : 11/364695  
DATED : February 2, 2010  
INVENTOR(S) : Georg Zehentner Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 810 days.

Signed and Sealed this

Thirtieth Day of November, 2010

David J. Kappos  
*Director of the United States Patent and Trademark Office*